(12) United States Patent
Goldburt

(10) Patent No.: US 10,044,915 B2
(45) Date of Patent: *Aug. 7, 2018

(54) CONTAINER WITH CAMERA AND ELECTRONIC DISPLAY

(71) Applicant: Medea Inc., Pleasanton, CA (US)

(72) Inventor: Tim Goldburt, New York City, NY (US)

(73) Assignee: Medea Inc., Pleasanton, CA (US)

(*) Notice: Subject to any disclaimer, the term of this patent is extended or adjusted under 35 U.S.C. 154(b) by 123 days.

This patent is subject to a terminal disclaimer.

(21) Appl. No.: 14/936,352

(22) Filed: Nov. 9, 2015

(65) Prior Publication Data

US 2016/0065805 A1 Mar. 3, 2016

Related U.S. Application Data

(63) Continuation of application No. 13/486,076, filed on Jun. 1, 2012, now Pat. No. 9,216,844.

(51) Int. Cl.
B65D 77/00 (2006.01)
H04N 5/225 (2006.01)
(Continued)

(52) U.S. Cl.
CPC ........... H04N 5/2252 (2013.01); B65D 23/12 (2013.01); B65D 25/20 (2013.01); B65D 85/72 (2013.01);
(Continued)

(58) Field of Classification Search
CPC ........ B65D 23/12; B65D 25/20; B65D 85/72; B65D 2203/12; A45C 11/38; H04N 7/14; H04N 5/2252; H04N 5/23293
(Continued)

(56) References Cited

U.S. PATENT DOCUMENTS 97,669 A 12/1869 McMillen
D20,656 S 3/1891 Dawes
(Continued)

FOREIGN PATENT DOCUMENTS

CN 2538046 Y 2/2003
CN 200981249 Y 11/2007
(Continued)

OTHER PUBLICATIONS

McHenry, Q., "iPhone: Change the Auto-Lock Delay", 3 pages, http://www.tech-recipes.com/rx/2484/iphone_change_the_auto_lock_delay/, Jun. 29, 2007.
(Continued)

Primary Examiner — Rafael Ortiz
(74) Attorney, Agent, or Firm — Lowenstein Sandler LLP

(57) ABSTRACT

A first cavity in an exterior wall of a hollow container body has first contours and a second cavity in the exterior wall of the hollow container body has second contours. A camera is disposed within the first cavity, the camera having a shape that conforms to the first contours of the first cavity. An electronic device comprising a display is disposed within the second cavity, the electronic device having a shape that conforms to the second contours of the second cavity. The camera is to generate pictures of objects external to the hollow container body, store the pictures in a memory, and provide the pictures to the electronic device. The electronic device has a connection to the camera and is to receive the pictures from the camera via the connection and to display the pictures that are received from the camera on the display.

20 Claims, 2 Drawing Sheets

(51) Int. Cl.
  *B65D 23/12* (2006.01)
  *B65D 25/20* (2006.01)
  *B65D 85/72* (2006.01)
  *H04N 5/232* (2006.01)

(52) U.S. Cl.
  CPC ..... *H04N 5/23293* (2013.01); *B65D 2203/12* (2013.01)

(58) Field of Classification Search
  USPC ...... 206/216, 701, 758, 316.1, 316.2, 459.1, 206/578; 352/37; 215/383, 386; 40/310; 396/322, 323, 429, 430; 353/48, 71, 82; 220/710; 345/1.1
  See application file for complete search history.

(56) References Cited

U.S. PATENT DOCUMENTS

| | | | |
|---|---|---|---|
| D23,100 S | 3/1894 | Fay et al. |
| 716,793 A | 12/1902 | Vogeler |
| 823,008 A | 6/1906 | Vendig |
| 126,278 A | 4/1918 | Heidenreich et al. |
| 155,419 A | 9/1925 | Alexander et al. |
| 165,360 A | 12/1927 | Allen et al. |
| 168,635 A | 10/1928 | Wallace et al. |
| D79,958 S | 11/1929 | DeWagner |
| 176,914 A | 7/1930 | Benjamin et al. |
| 177,009 A | 7/1930 | West et al. |
| D85,487 S | 11/1931 | Meyer |
| 185,655 A | 5/1932 | Montalvo et al. |
| 3,864,976 A | 2/1975 | Parker |
| 3,965,590 A | 6/1976 | Algaze |
| 3,996,879 A | 12/1976 | Walton |
| 4,607,756 A | 8/1986 | Courtman |
| D285,903 S | 9/1986 | Courtman |
| 4,765,465 A | 8/1988 | Yamada et al. |
| 4,928,412 A | 5/1990 | Nishiyama |
| D314,308 S | 2/1991 | Cogswell |
| D317,123 S | 5/1991 | Colani |
| D318,224 S | 7/1991 | Altobelli |
| 5,125,866 A | 6/1992 | Arad et al. |
| 5,168,646 A | 12/1992 | Dippong et al. |
| 5,201,431 A | 4/1993 | Berger et al. |
| 5,211,699 A | 5/1993 | Tipton |
| 5,297,247 A | 3/1994 | Kan |
| 5,339,548 A | 8/1994 | Russell |
| 5,347,453 A | 9/1994 | Maestre |
| 5,379,916 A | 1/1995 | Martindale et al. |
| 5,553,735 A | 9/1996 | Kimura |
| 5,575,553 A | 11/1996 | Tipton |
| 5,678,925 A | 10/1997 | Garmaise et al. |
| 5,774,876 A | 6/1998 | Woolley et al. |
| 5,823,346 A | 10/1998 | Weiner |
| 5,863,752 A | 1/1999 | Court et al. |
| 5,884,421 A | 3/1999 | Key |
| 5,992,678 A | 11/1999 | Willey |
| 6,037,872 A | 3/2000 | Dunnum |
| 6,062,380 A | 5/2000 | Dorney |
| 6,084,526 A | 7/2000 | Blotky et al. |
| 6,158,870 A | 12/2000 | Ramirez |
| D436,852 S | 1/2001 | Chan |
| 6,213,616 B1 | 4/2001 | Chien |
| 6,302,608 B1 | 10/2001 | Holmes et al. |
| 6,393,401 B1 | 5/2002 | Loudermilk et al. |
| 6,406,348 B1 | 6/2002 | Pearce |
| 6,504,481 B2 | 1/2003 | Teller |
| D470,770 S | 2/2003 | Machado et al. |
| 6,527,402 B1 | 3/2003 | Borri |
| D473,469 S | 4/2003 | Claessen |
| 6,588,131 B2 | 7/2003 | O'Connell, Jr. |
| 6,588,593 B2 | 7/2003 | Woskoski |
| 6,747,918 B2 | 6/2004 | Hight et al. |
| 6,762,734 B2 | 7/2004 | Blotky et al. |
| 6,856,932 B1 | 2/2005 | Wallace |
| 6,872,116 B1 | 3/2005 | Dunnum et al. |
| 6,898,572 B2 | 5/2005 | Ohyama |
| 6,923,549 B2 | 8/2005 | Hoy |
| 6,945,418 B2 | 9/2005 | Guido et al. |
| 7,000,343 B1 | 2/2006 | Teichman |
| D521,388 S | 5/2006 | Andoh |
| D521,389 S | 5/2006 | Andoh |
| D522,865 S | 6/2006 | Andoh |
| D523,346 S | 6/2006 | Andoh |
| 7,086,075 B2 | 8/2006 | Swix et al. |
| 7,152,832 B2 | 12/2006 | Wochnick |
| 7,163,311 B2 | 1/2007 | Kramer |
| 7,175,266 B2 | 2/2007 | Helterline |
| 7,188,350 B2 | 3/2007 | Rosowski |
| 7,188,491 B2 | 3/2007 | Donald, II et al. |
| 7,300,171 B2 | 11/2007 | Sutton |
| D571,153 S | 6/2008 | Lopez |
| 7,383,650 B2 | 6/2008 | Duesler |
| D574,249 S | 8/2008 | Seum et al. |
| D575,583 S | 8/2008 | Morgan |
| 7,412,505 B2 | 8/2008 | Slemmer et al. |
| 7,413,082 B2 | 8/2008 | Adler et al. |
| 7,535,337 B2 | 5/2009 | Overhultz et al. |
| D596,037 S | 7/2009 | Slubski |
| 7,593,867 B2 | 9/2009 | Deakin et al. |
| 7,613,431 B2 | 11/2009 | Brand |
| 7,690,533 B2 | 4/2010 | Stilley |
| D617,200 S | 6/2010 | Goldburt |
| 7,824,051 B2 | 11/2010 | Walter et al. |
| 7,837,333 B2 | 11/2010 | Chou et al. |
| 7,934,845 B2 | 5/2011 | Yang |
| 7,954,970 B2 | 6/2011 | Goldburt |
| 8,056,273 B2 | 11/2011 | Goldburt |
| 8,123,033 B2 | 2/2012 | Goldburt |
| 8,232,981 B2 | 7/2012 | Sandy |
| 8,989,673 B2 | 3/2015 | Sandy |
| 9,061,797 B2 | 6/2015 | Goldburt |
| 9,152,968 B2 | 10/2015 | Goldburt |
| 9,216,844 B2 | 12/2015 | Goldburt |
| 9,376,235 B2 | 6/2016 | Goldburt |
| 9,628,434 B2 | 4/2017 | Laidlaw et al. |
| 2002/0070861 A1 | 6/2002 | Teller |
| 2002/0097195 A1 | 7/2002 | Frank |
| 2002/0104848 A1 | 8/2002 | Burrows et al. |
| 2002/0126150 A1 | 9/2002 | Parry |
| 2002/0169635 A1 | 11/2002 | Shillingburg |
| 2002/0190869 A1 | 12/2002 | Blotky et al. |
| 2003/0076672 A1 | 4/2003 | Head |
| 2003/0099158 A1 | 5/2003 | De la Huerga |
| 2003/0122730 A1* | 7/2003 | Frank ............... G09F 9/30 345/1.1 |
| 2003/0129283 A1 | 7/2003 | Martinez Carballido |
| 2003/0210141 A1 | 11/2003 | Iacovino |
| 2003/0226298 A1 | 12/2003 | Bjork |
| 2004/0004829 A1 | 1/2004 | Policappelli |
| 2004/0026357 A1 | 2/2004 | Beck et al. |
| 2004/0076109 A1 | 4/2004 | Rosowski |
| 2004/0111640 A1 | 6/2004 | Baum |
| 2004/0118022 A1 | 6/2004 | Duesler |
| 2004/0140286 A1 | 7/2004 | Zoller |
| 2004/0148117 A1 | 7/2004 | Kirshenbaum et al. |
| 2004/0163103 A1 | 8/2004 | Swix et al. |
| 2004/0195117 A1 | 10/2004 | Brand |
| 2004/0206828 A1 | 10/2004 | Harris |
| 2004/0237574 A1 | 12/2004 | Donald, II et al. |
| 2005/0021406 A1 | 1/2005 | Ohyama |
| 2005/0024858 A1 | 2/2005 | Johnson |
| 2005/0036301 A1 | 2/2005 | Haines |
| 2005/0134461 A1 | 6/2005 | Gelbman et al. |
| 2005/0152392 A1 | 7/2005 | Lim et al. |
| 2005/0154644 A1 | 7/2005 | Deakin et al. |
| 2005/0161558 A1 | 7/2005 | Stahl et al. |
| 2005/0168544 A1 | 8/2005 | Helterline |
| 2005/0193612 A1 | 9/2005 | Lowry |
| 2005/0205437 A1 | 9/2005 | Huffman et al. |
| 2005/0207141 A1 | 9/2005 | Boesch et al. |
| 2005/0229449 A1 | 10/2005 | Shepley |
| 2005/0270396 A1 | 12/2005 | Miyashita et al. |
| 2006/0022806 A1 | 2/2006 | Auerbach |
| 2006/0087831 A1 | 4/2006 | Kramer |

(56) References Cited

U.S. PATENT DOCUMENTS

| | | |
|---|---|---|
| 2006/0118507 A1 | 6/2006 | Feldman |
| 2006/0139928 A1 | 6/2006 | Griffiths et al. |
| 2006/0191812 A1 | 8/2006 | Oudekerk et al. |
| 2006/0202042 A1 | 9/2006 | Chu |
| 2006/0207907 A1 | 9/2006 | Meehan |
| 2006/0231109 A1 | 10/2006 | Howell et al. |
| 2007/0024465 A1 | 2/2007 | Howell et al. |
| 2007/0035380 A1 | 2/2007 | Overhultz et al. |
| 2007/0055566 A1 | 3/2007 | Gaughan et al. |
| 2007/0069883 A1 | 3/2007 | Collier, Jr. et al. |
| 2007/0091123 A1 | 4/2007 | Akashi |
| 2007/0158293 A1 | 7/2007 | Andreani |
| 2007/0191983 A1 | 8/2007 | Griffits et al. |
| 2007/0214055 A1 | 9/2007 | Temko |
| 2007/0226079 A1 | 9/2007 | Chessick |
| 2007/0299778 A1 | 12/2007 | Haveson et al. |
| 2008/0010871 A1 | 1/2008 | Holmes et al. |
| 2008/0023357 A1 | 1/2008 | Whiteis |
| 2008/0034628 A1 | 2/2008 | Schnuckle |
| 2008/0074625 A1 | 3/2008 | Lai et al. |
| 2008/0083767 A1 | 4/2008 | O'Neal |
| 2008/0100469 A1 | 5/2008 | Goldburt |
| 2008/0108308 A1 | 5/2008 | Ullah |
| 2008/0128300 A1 | 6/2008 | Bahar et al. |
| 2008/0149589 A1* | 6/2008 | Lach ............ A45F 3/16 215/386 |
| 2008/0178251 A1 | 7/2008 | Shin |
| 2008/0243919 A1 | 10/2008 | Ullmann |
| 2008/0264816 A1 | 10/2008 | Yeh |
| 2008/0296191 A1 | 12/2008 | Ransch |
| 2008/0314861 A1 | 12/2008 | Goldburt |
| 2008/0317906 A1 | 12/2008 | Goldburt |
| 2008/0319876 A1 | 12/2008 | Goldburt |
| 2009/0159761 A1 | 6/2009 | Sandy |
| 2009/0293328 A1 | 12/2009 | Bull |
| 2010/0101124 A1 | 4/2010 | Sorensen |
| 2010/0153222 A1 | 6/2010 | Pandey |
| 2010/0182518 A1 | 7/2010 | Kirmse et al. |
| 2010/0300913 A1 | 12/2010 | Goldburt |
| 2010/0300914 A1 | 12/2010 | Goldburt et al. |
| 2011/0100852 A1 | 5/2011 | Goldburt |
| 2011/0100853 A1 | 5/2011 | Goldburt |
| 2011/0122120 A1 | 5/2011 | Feuilloley |
| 2011/0155603 A1 | 6/2011 | Goldburt |
| 2011/0155604 A1 | 6/2011 | Goldburt |
| 2011/0157022 A1* | 6/2011 | Goldburt ............ G06F 1/163 345/169 |
| 2011/0303579 A1 | 12/2011 | Sanders |
| 2012/0019398 A1 | 1/2012 | Vogt et al. |
| 2012/0105424 A1 | 5/2012 | Lee et al. |
| 2012/0171963 A1 | 7/2012 | Tsfaty |
| 2012/0239470 A1 | 9/2012 | Goldburt |
| 2012/0273372 A1 | 11/2012 | Goldburt et al. |
| 2013/0319892 A1 | 12/2013 | Goldburt |
| 2014/0020061 A1 | 1/2014 | Popp et al. |
| 2014/0094126 A1 | 4/2014 | Sandy |
| 2014/0155031 A1 | 6/2014 | Lee et al. |
| 2014/0324585 A1 | 10/2014 | Mederos |
| 2014/0351866 A1 | 11/2014 | Wang |
| 2015/0012433 A1 | 1/2015 | Yang et al. |
| 2015/0334079 A1 | 11/2015 | Laidlaw et al. |
| 2016/0018803 A1 | 1/2016 | Goldburt |
| 2016/0143228 A1 | 5/2016 | De Groot et al. |
| 2016/0286543 A1 | 9/2016 | Putterman et al. |
| 2017/0193795 A1 | 7/2017 | Laidlaw et al. |

FOREIGN PATENT DOCUMENTS

| | | |
|---|---|---|
| CN | 200983162 Y | 11/2007 |
| EP | 0482680 A1 | 4/1992 |
| EP | 1731068 A1 | 12/2006 |
| JP | 07-027624 | 1/1995 |
| KR | 10-2011-0008861 A | 1/2011 |
| KR | 10-2012-0018246 A | 3/2012 |
| KR | 10-2013-0011352 A | 1/2013 |
| WO | 2003/013959 A2 | 2/2003 |
| WO | 2003/099039 | 12/2003 |
| WO | 2010/138107 | 12/2010 |
| WO | 2013/179239 A1 | 12/2013 |

OTHER PUBLICATIONS

"Search Report IEC 3600", dated Nov. 19, 2009, Scientific and Technical Information Center, 36 pages.

Lee, "Understanding an dusing iBeacons", May/Jun. 2014, CODE Magazine, Hyperlink: http://www.codemag.com/Article/1405051.

Geesche Jacobsen "Wine of the future: just add water" Jun. 24, 2003, http://www.smh.com.au/articles/2003/06/23/1056220544761.html.

Anthony Rose "The Future of the bottle" Jun. 21, 2003, http://www.independent.co.uk/life-style/food-and-drink/features/the-future-of-the-bottle-109770.html.

* cited by examiner

CONTAINER WITH CAMERA AND ELECTRONIC DISPLAY

RELATED APPLICATIONS

This patent application is a continuation application of U.S. patent application Ser. No. 13/486,076, filed Jun. 1, 2012, which is herein incorporated by reference.

BACKGROUND

The present invention relates generally to containers, in particular to containers for alcoholic and non-alcoholic beverage.

Containers of the above mentioned general type are known in the art, and manufactured and used in great varieties. The containers are usually provided with labels. Also containers are known, which are provided with electronic devices of various types. It is believed that the existing containers for alcoholic and non-alcoholic beverages can be further improved.

SUMMARY

Accordingly, it is an object of the present invention to provide a container for beverages, which is a further improvement of the existing containers for beverages.

In keeping with these objects and with others which will become apparent hereinafter, one feature of the present invention resides, briefly stated, in a beverage container comprising a hollow container body for accommodating a beverage, and a camera attached to said container body of the beverage container and configure to make pictures.

In accordance with another feature of the present invention, means are provided for projecting the pictures made by the camera onto an electronic display provided in the container body, or into an interior of the container body, or onto an outside surface, or various combinations of the above are possible.

In accordance with the present invention, the camera makes pictures of still images or moving images, and the projecting means project the still images, or the moving images, or both onto corresponding objects. In accordance with a further feature of the present invention, the pictures produced by the camera can also be stored, or stored and reproduced later, or wirelessly transmitted to recipients, or printed, or combinations of the above are possible as well.

In accordance with another feature of the present invention, means can be provided for recording audio messages during making pictures or independently from them, and reproducing of the recorded audio messages or transmitting the latter.

In accordance with another feature of the present invention, the camera can be introduced into a cavity of the container body together with another electronic device or separately from the electronic device.

The novel features of the present invention are set forth in particular in the appended claims. The invention itself, however, both as to its construction and its method of operation, will be best understood from the following description of the preferred embodiments, which is accompanied by the following drawings.

DETAILED DESCRIPTION

Figure 1:
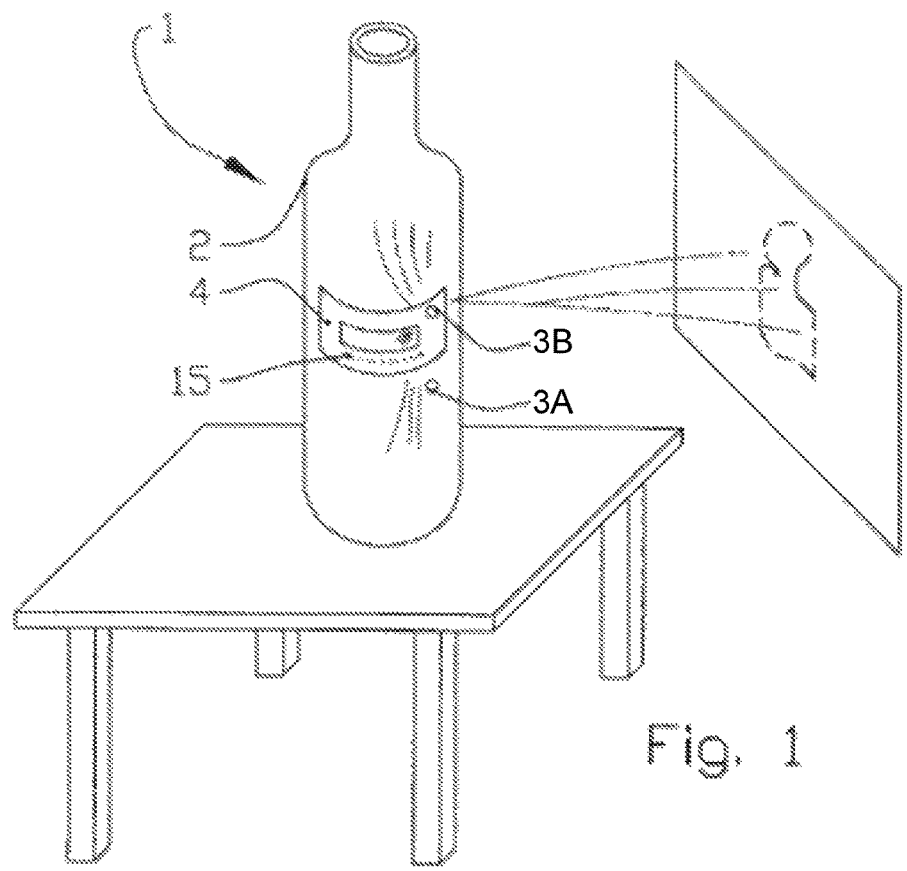
FIG. 1 of the drawings is a perspective view showing a container for beverages in accordance with the present invention.

In accordance with the present invention, a beverage container is provided for accommodating an alcoholic or a non-alcoholic beverage as identified with reference numeral 1. The beverage container 1 has a container wall 2 which delimits a hollow interior accommodating the beverage.

Figure 2:
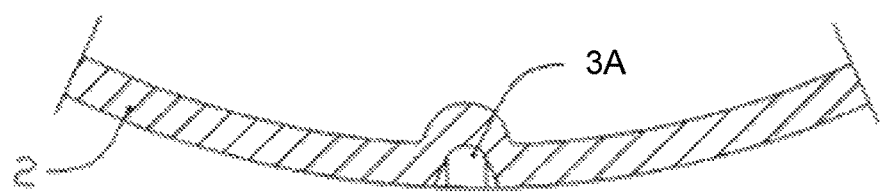
FIG. 2 is a view showing a partial cross section of a wall of the beverage container in accordance with one embodiment of the present invention.

The beverage container 1 is provided with one or more camera 3A-B for taking pictures. The camera(s) 3A-B can be formed as an electronic camera. Camera 3B can be for example introduced directly into a cavity formed in the container wall 2 by a snap action and retained in it, as shown in FIG. 2, and used for taking picture while being on the beverage container 1. The camera 3B can be also removed from the cavity of the container wall by simply pulling it out, and thereafter used outside of and without the beverage container 1, as will be explained hereinafter.

Figure 3:
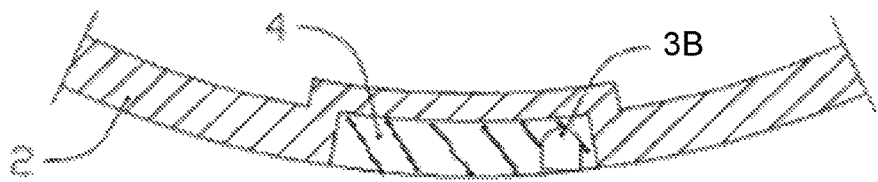
FIG. 3 is a view showing a partial cross section of a wall of the beverage container in accordance with another embodiment of the present invention.
Figure 4:
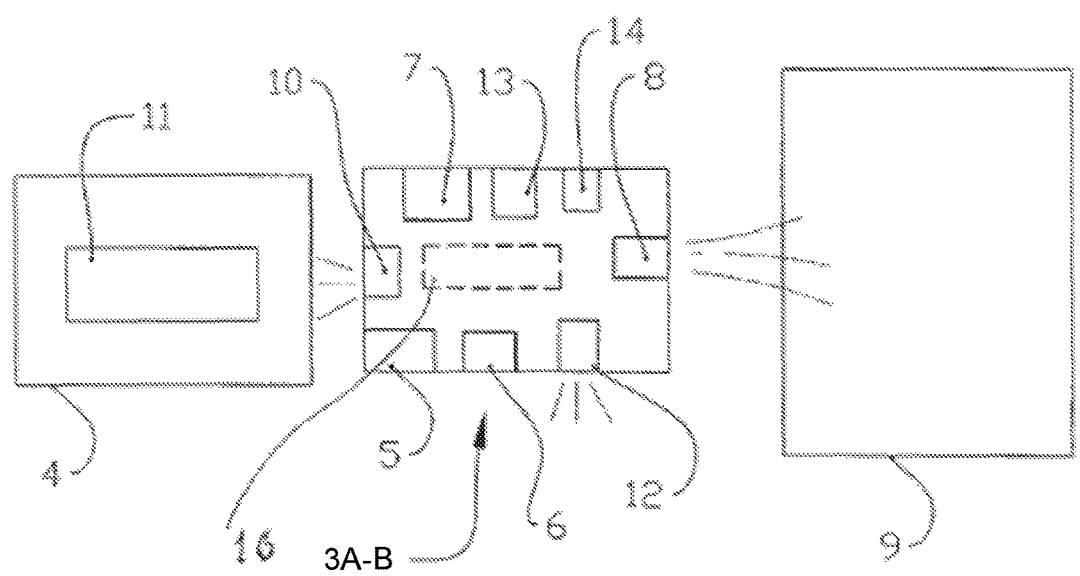
FIG. 4 is a view showing a schematic diagram of an electronic circuit of the inventive beverage container.

The camera 3A, on the other hand, can be incorporated into an electronic device 4, which, together with the camera 3A, can be introduced into a cavity of the container wall for example by snap action and held in it, as shown in FIG. 3. The electronic device 4 can be also removed from the cavity of the container wall together with the camera 3A, so that the electronic device 4 with the camera 3A, or the camera 3A and the electronic device 4 separately, can be used outside of the beverage container 1.

The camera(s) 3A-B can be formed and operate as a camera which produces pictures of still images, such as a photo camera, or pictures of moving images, such as a movie camera, as known per se in the art of cameras. When it is located on the beverage container 1 it can make pictures of a person or an object in front of the beverage container or at any location by simply turning the beverage container 1 with the camera 3A-B in a corresponding direction and activating the camera. The same can be also done when the camera 3A-B or the electronic device 4 with the camera 3A-B are removed from the beverage container 1 and used separately.

The camera(s) 3A-B can store the pictures which it makes, of the still images or the moving images, in its memory 5. The camera(s) 3A-B further has output means 6 for outputting the pictures made by it in order to print the pictures. The camera(s) 3A-B further has output means 7 for wirelessly transmitting the picture made by it, for example via internet.

The camera(s) 3A-B is further provided with projecting means for projecting the pictures made by it, including still or moving images. The projecting means include a projecting unit 8 which projects the images onto an outside screen 9, a projecting unit 10 which projects the images onto a display 11 of the electronic device 4, a projecting unit 12 which projects the images into the interior of the beverage container 1 into its hollow space which can be filled with a beverage onto the electronic device 4 etc.

The camera(s) 3A-B and/or the electronic device 4 can be further provided with audio recording means 13 which can record audio messages. The recorded audio messages can accompany or they do not accompany the images produced by the camera(s) 3A-B. The recorded audio messages also can have an audio content that corresponds to or does not correspond to the content of the images produced by the camera(s) 3A-B. The camera also has audio messages reproducing means 14, which reproduce the audio recorded audio messages. The audio recording means and the audio reproducing means can be combined with one another.

The camera(s) 3A-B and/or the electronic device 4 further has control means 15 which control all operations of the camera(s) 3A-B, such as taking pictures, printing the pictures, transmitting the pictures wirelessly or via wires, projecting the picture in different directions, recording audio messages, reproducing audio messages, etc. The control means 15 can be formed as a plurality of operation-specific buttons, as a keyboard, etc.

A microprocessor 16 is further provided in the beverage container. It is designed and operates to perform all required functions of the electronic components disclosed hereinabove.

The electronic device 4 of the container for beverages 1 can be formed and performs the functions as disclosed, for example, in patent applications Ser. Nos. 11/588,494, 11/821,334, and 11/821,349, which are incorporated by reference herein.

The invention is not limited to the details shown since various modifications and structural changes are possible without departing from the spirit of the present invention.

What is claimed as new and desired to be protected by Letters Patent is set forth in the appended claims.

What is claimed is:

1. A container comprising:
a hollow container body;
a first cavity in an exterior wall of the hollow container body, the first cavity having first contours;
a camera, attached to the exterior wall of said hollow container body in the first cavity, to generate pictures of objects external to the container, wherein the camera has a shape that conforms to the first contours of the first cavity;
a second cavity in the exterior wall of the hollow container body, the second cavity being larger than the first cavity;
a first projector, attached to the exterior wall of said hollow container body in the second cavity, to project the pictures generated by the camera onto a surface of a remote object external to the container; and
a second projector, attached to the exterior wall of said hollow container body in the second cavity, to project the pictures generated by the camera through a liquid contained by the hollow container body and onto an interior wall of the hollow container body, wherein at least one of the first projector or the second projector has a connection to the camera and is to receive the pictures from the camera via the connection.

2. The container of claim 1, wherein the pictures generated by the camera comprise at least one of still images or moving images.

3. The container of claim 1, further comprising:
a memory to store the pictures generated by the camera.

4. The container as defined in claim 3, further comprising:
a processor to access one or more of the pictures generated by the camera from the memory and to display the one or more pictures on a display attached to said hollow container body.

5. The container of claim 1, further comprising:
an audio recorder to record audio messages during generation of the pictures or independently from the generation of the pictures; and
a speaker to output the recorded audio messages.

6. The container of claim 1, wherein said camera is insertable into and removable from the first cavity.

7. The container of claim 6, further comprising:
an electronic device comprising a display, a memory, a processor, the first projector and the second projector, wherein the electronic device is introducible into the second cavity.

8. The container of claim 1, further comprising:
a display, attached to said exterior wall of the hollow container body in the second cavity, to display the pictures generated by the camera.

9. The container of claim 1, further comprising:
a wireless network adapter to transmit the pictures generated by the camera to one or more recipients.

10. The container of claim 1, wherein the hollow container body comprises a rigid body.

11. A rigid container comprising:
a hollow container body;
a first cavity in an exterior wall of the hollow container body, the first cavity having first contours;
a second cavity in the exterior wall of the hollow container body that is separate and distinct from the first cavity, the second cavity being larger than the first cavity and having second contours;
a camera, disposed within the first cavity, the camera having a first shape that conforms to the first contours of the first cavity; and
an electronic device, disposed within the second cavity, the electronic device having a second shape that conforms to the second contours of the second cavity, wherein the electronic device comprises a display;
wherein the camera is to generate pictures of objects external to the rigid container, store the pictures in a memory, and provide the pictures to the electronic device; and
wherein the electronic device has a connection to the camera and is to receive the pictures from the camera via the connection and is to display the pictures that are received from the camera on the display.

12. The rigid container of claim 11, the electronic device further comprising:
a first projector to project the pictures generated by the camera onto an interior of the hollow container body.

13. The rigid container of claim 12, the electronic device further comprising:
a second projector to project the pictures generated by the camera onto a surface of a remote object external to the rigid container.

14. The rigid container of claim 11, wherein the electronic device further comprises a processor to access one or more of the pictures generated by the camera from the memory and to display the one or more pictures on the display.

15. The rigid container of claim 11, wherein the pictures generated by the camera comprise at least one of still images or moving images.

16. The rigid container of claim 11, wherein the electronic device further comprises an additional memory to store one or more of the pictures generated by the camera.

17. The rigid container of claim 11, wherein the electronic device further comprises:
an audio recorder to record audio messages during generation of the pictures or independently from the generation of the pictures; and
a speaker to output the audio messages.

18. The rigid container of claim 11, wherein said camera is insertable into and removable from the first cavity.

19. The rigid container of claim 11, the electronic device further comprising a wireless network adapter to transmit the pictures to one or more recipients.

20. The rigid container of claim 11, wherein the connection is a wired connection, and wherein the electronic device is to receive the pictures from the camera via the wired connection.

* * * * *